United States Patent
Maurer et al.

(10) Patent No.: US 8,955,419 B2
(45) Date of Patent: Feb. 17, 2015

(54) STEADY REST

(75) Inventors: Eckhard Maurer, Oberteuringen (DE); Jürgen Marquart, Markdorf (DE)

(73) Assignee: SMW-AUTOBLOCK Spannsysteme GmbH, Meckenbeuren (DE)

( * ) Notice: Subject to any disclaimer, the term of this patent is extended or adjusted under 35 U.S.C. 154(b) by 354 days.

(21) Appl. No.: 13/506,129

(22) Filed: Mar. 29, 2012

(65) Prior Publication Data
US 2012/0260779 A1 Oct. 18, 2012

(30) Foreign Application Priority Data

Mar. 29, 2011 (EP) ..................... 11160222

(51) Int. Cl.
*B24B 41/06* (2012.01)
*B23Q 1/76* (2006.01)

(52) U.S. Cl.
CPC ....................... *B23Q 1/76* (2013.01)
USPC .......................................... 82/162

(58) Field of Classification Search
USPC ............ 82/162, 164; 451/408, 406; 192/56.1; 464/37; 279/108
See application file for complete search history.

(56) References Cited

U.S. PATENT DOCUMENTS

| | | | | |
|---|---|---|---|---|
| 4,399,639 A | * | 8/1983 | Lessway | ...................... 451/408 |
| 4,650,237 A | * | 3/1987 | Lessway | ................... 294/119.1 |
| 5,058,468 A | * | 10/1991 | Lessway | ...................... 279/133 |
| 5,237,780 A | | 8/1993 | Lessway | |
| 5,285,599 A | * | 2/1994 | Lessway | ........................ 451/49 |
| 5,481,951 A | * | 1/1996 | Kiefer | .............................. 82/162 |
| 6,699,113 B2 | * | 3/2004 | Lessway | ...................... 451/408 |
| 6,896,603 B1 | | 5/2005 | Lessway | |
| 7,597,035 B2 | * | 10/2009 | Rehm | ............................. 82/157 |
| 8,266,992 B2 | * | 9/2012 | Rehm | ............................. 82/157 |
| 2003/0077994 A1 | | 4/2003 | Lessway | |

\* cited by examiner

*Primary Examiner* — Daniel Howell
*Assistant Examiner* — Nicole N Ramos
(74) *Attorney, Agent, or Firm* — Pandiscio & Pandiscio

(57) ABSTRACT

A steady rest for centering a rotationally symmetrical workpiece in a space, the rest comprising two housing halves arranged at a distance from one another and connected together, a plate-shaped middle piece disposed between the two housing halves, the middle piece being mounted in the housing halves by means of an actuator piston which can be moved in an axial direction to the workpiece, two linear guide grooves disposed in both opposite large-surface end faces of the middle piece, with the guide grooves running in a cross-shaped arrangement and at an angle to a movement direction of the middle piece, two outer steady rest arms, each mounted in one of the linear guide grooves of the middle piece in a movable arrangement, and a middle steady rest arm attached to the middle piece between the outer steady rest arms.

12 Claims, 15 Drawing Sheets

STEADY REST

BACKGROUND OF THE INVENTION

1. Field of the Invention

The present invention relates to a steady rest for centering a rotationally symmetrical workpiece in a space.

2. Description of the Prior Art

Steady rests of this kind have been used for decades for supporting rotationally symmetrical workpieces on machines tools. In particular, with heavy and long rotationally symmetrical workpieces, it is necessary to secure them centrally in the space by means of several steady rests spaced apart from one another in order to compensate for the bowing of the workpiece. The workpieces undergo bowing under their own weight, especially when rotating for machining involving metal cutting.

In the course of a plurality of machining steps, furthermore, additional machining forces are created which act on the workpieces and by means of which the central positioning of the workpiece could be changed. The steady rests of prior art are therefore intended to prevent the machining forces which act on the workpieces from giving rise to positional changes of this kind.

Machining involving metal cutting reduces the weight of the workpieces, as a result of which there is often also a change in position, with the effect that the steady rests have to be reopened after a particular reduction in the weight of the workpieces in order to position the workpieces in the space so that the lengthways axis in the clamped workpiece runs along a straight line without deviating from the central axis.

A steady rest with an internal adjusting device for the central axis of the workpieces is disclosed in EP 0 554 506 61. In order to achieve this, it is necessary for the two outer steady rest arms to be moved differently in relation to one another in order to achieve the vertical alignment of the workpiece. Horizontal centering of the workpiece is performed jointly with all three steady rest arms.

EP 0 554 506 B1 proposes an adjusting device for vertical and horizontal alignment of the steady rest arms which has an extremely complex design.

It has proven to be a disadvantage of an adjusting device of this kind that it is very expensive to manufacture, and that the operation and mode of function of the adjusting device is complicated, such that specialist personnel are required who have the corresponding experience for undertaking the vertical and horizontal alignment of the steady rest arms.

DE 60208835 T2 or EP 1 302 275 A2 disclose a vertically adjustable steady rest, the steady rest arms of which have temporally discrete contact points on the contact surface of the workpiece by means of rocker and sliding elements which are mounted on the housing halves.

The sliding and rocker elements, also referred to as tappets, adjust the positions of the two outer steady rest arms synchronously with one another in such a way that the control pins projecting from the steady rest arms enter into active contact with the contact surfaces either simultaneously or with a time offset, and are therefore moved in the direction of the workpiece. Moving the sliding elements sideways to the movement direction of the middle piece and the angled surface formed on it causes the aforementioned adjustment of the feed sequences of the two outer steady rest arms to take place.

Although this state of the art has proven effective for adjusting the feed movement of the steady rest arms, it is, however, necessary to produce additional components and to work holes into the middle piece or the housing in which the sliding and rocker elements are mounted in a sliding arrangement. Production of such high-precision components is extremely costly, because the sliding and rocker elements must have identical contact surfaces running at an angle. If there are fault tolerances due to tolerance deviations which are a result of the manufacturing process, then synchronous feed or adjustment of the two outer steady rest arms is not possible, because this would result in an unwanted movement of the workpiece.

SUMMARY OF THE INVENTION

Therefore, it is the task of the present invention to provide a steady rest of the aforementioned type which guarantees that high machining forces are reliably supported without the central positioning of the workpiece in the space being changed by these forces, and that at the same time the centering of the workpiece in the space can be adjusted in a quick and easy way by changing the position of the steady rest arms or the middle piece, without complex adjusting steps being required.

In accordance with the present invention, two guide strips are inserted in the two housing halves in an axially adjustable manner, and each of them has a curved guide cam disposed therein. Therefore the two outer steady rest arms can be mounted in a movable arrangement in the guide cams by means of guide pins projecting from them, in order, for one thing, to adjust the distance between the middle piece and the workpiece to be clamped by means of the first half shell and, for another thing, to adjust the position of the guide strips in relation to one another using the second half shell, as a result of which the position of the workpiece in the space can be aligned so that the axis of rotation of the workpiece runs flush with the middle point of the steady rest.

The half shells are adjusted in a straightforward manner with the help of setscrews and compression springs without requiring significant professional experience, because the half shells are moved in their position on the housing halves at right angles to the lengthways axis of the steady rest, as a result of which the distance of the middle piece from the workpiece and the positioning of the guide strips can be adjusted in small steps.

Furthermore, the necessary components are inexpensive to manufacture, because the required position is only needed in the area of the guide cam in the corresponding guide strips, when the guide pins reach the stop position in these and are moved along the contour of the guide cam.

BRIEF DESCRIPTION OF THE DRAWINGS

The drawings show a sample embodiment configured in accordance with the present invention, the details of which are explained below. In the drawings.

DESCRIPTION OF THE PREFERRED EMBODIMENTS

Figure 1:
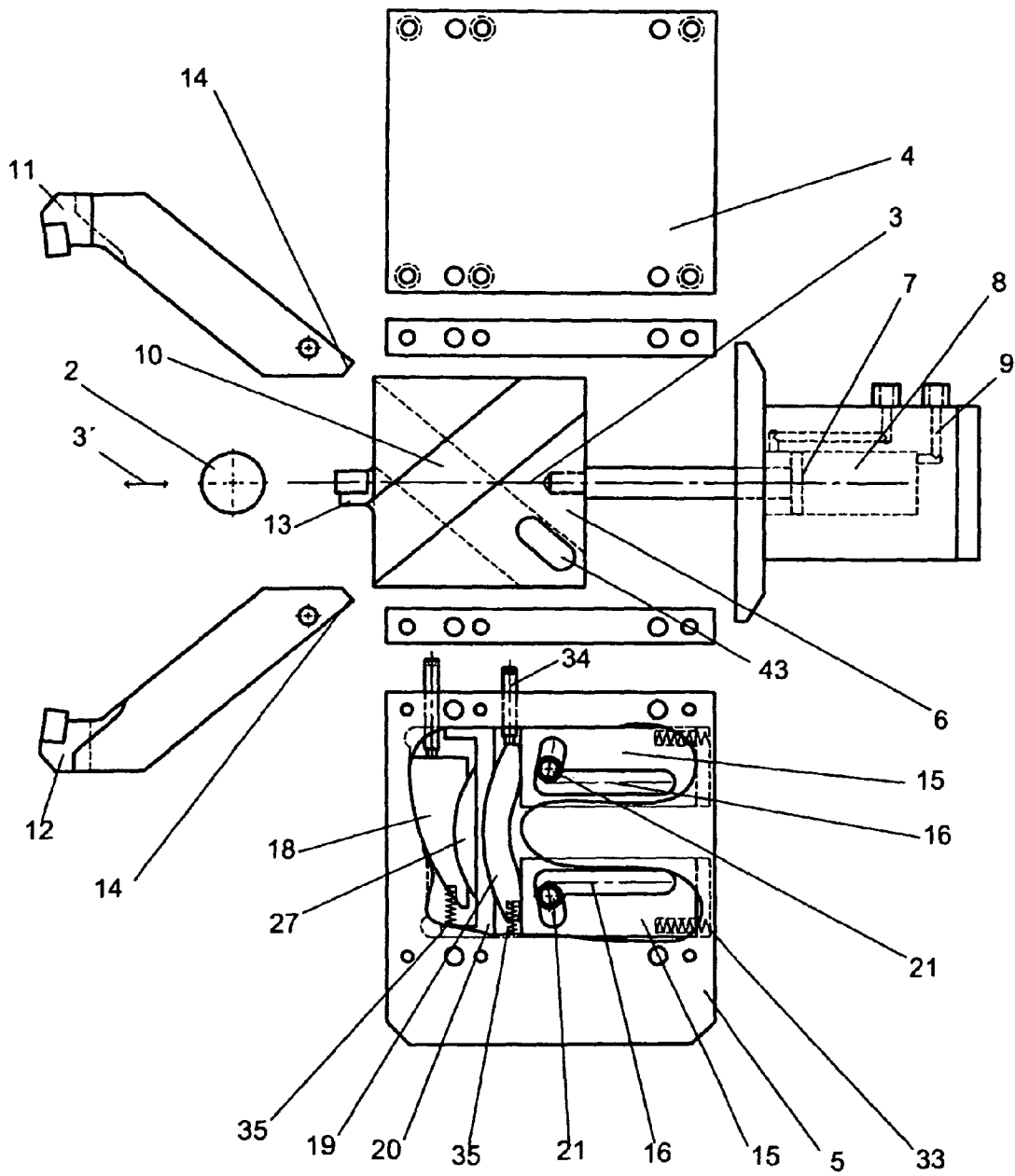
FIG. 1 shows in an exploded view a steady rest with two housing halves between which a plate-shaped middle piece moveable axially is inserted, the middle piece is driven by an actuator piston, with three steady rest arms allocated to the middle piece, by means of which a workpiece is centered in the space, and with two sickle shaped curved half shells inserted in one of the housing halves which can be moved transversally in relation to the direction of movement of the middle piece.
Figure 2:
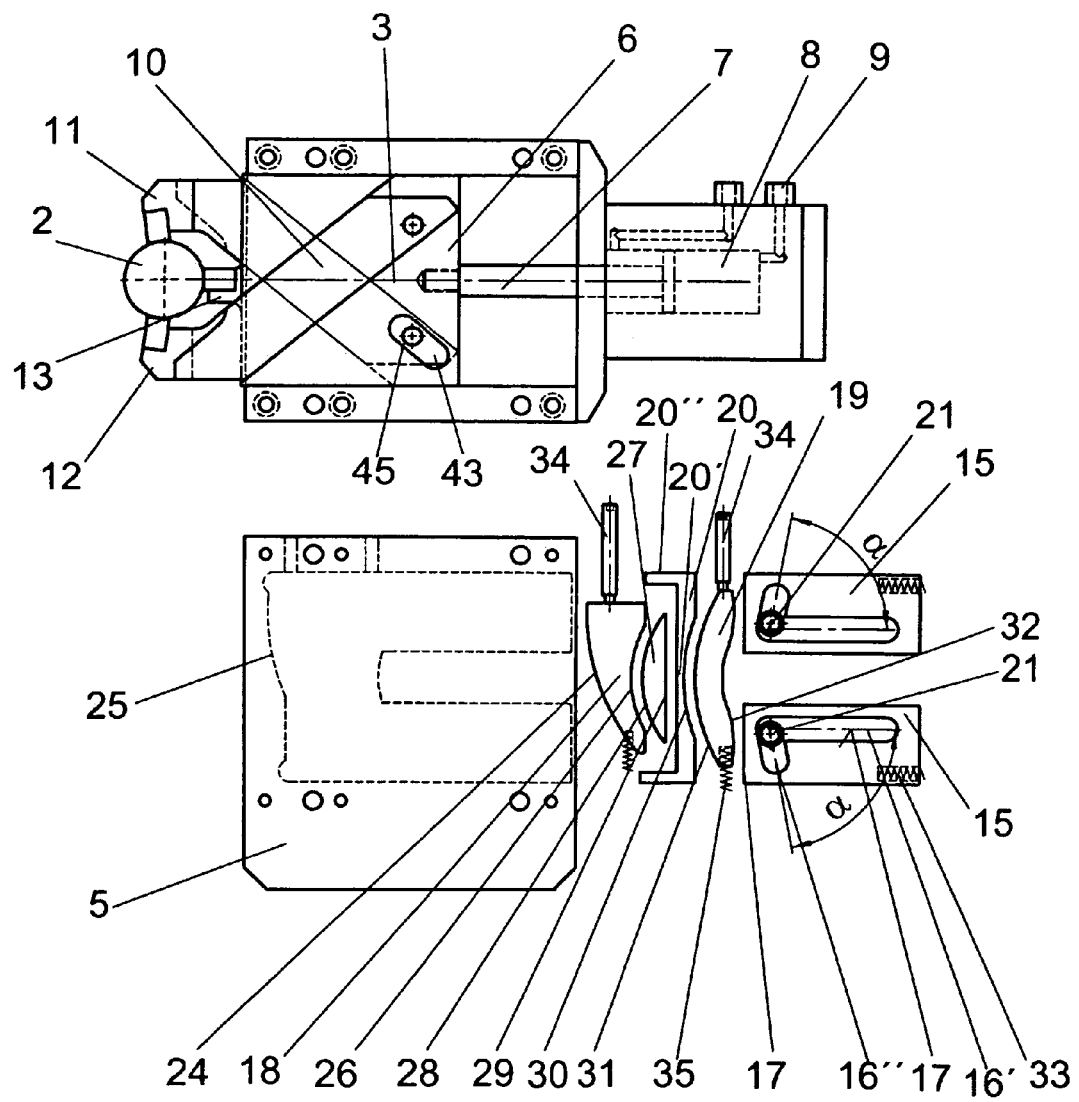
FIG. 2 shows the steady rest in accordance with FIG. 1, in an exploded view and in a partially assembled condition.

FIGS. 1 and 2 show a steady rest 1 by means of which a rotationally symmetrical workpiece 2 is centred and held in a rotating arrangement in the space in such a way that the axis of rotation of the workpiece 2 does not if possible undergo any bowing out of the horizontal under its own weight and due to the machining forces acting on the workpiece 2. The axis of rotation of the workpiece 2 should accordingly be held in a specified position in the space by the steady rest 1.

The steady rest 1 consists of two housing halves 4 and 5 which have a lengthways axis 3 running at right angles to the axis of rotation of the workpiece 2. A middle piece 6 is mounted in the two housing halves 4 and 5, can be moved axially, the movement direction thereof is identified with the reference number 3' and runs flush with the lengthways axis 3 of the steady rest 1.

The middle piece 6 is connected to an actuator piston 7 by means of a screw/thread connection, for example. The actuator piston 7 runs in a pressure space 8 which can be filled, for example with hydraulic fluid, or evacuated by means of control lines 9, with the effect that the pressure space 8 has different pressure conditions, as a result of which the actuator piston 7 can be moved with a stroke motion. Consequently, the middle piece 6 can be driven by the actuator piston 7 in the movement direction 3' and can be moved up to the workpiece 2 or pulled away from it.

The middle piece 6 has two linear guide grooves 10 disposed therein, which run towards one another in a cross shape on two opposite large-surface end faces of the middle piece 6. The two linear guide groves 10 are arranged at an angle, preferably an angle of about 10° to 30° in relation to the lengthways axis 3 of the steady rest 1.

Two steady rest arms 11 and 12 of the steady rest 1 are inserted in the linear guide grooves 10 in a moveable arrangement. A middle steady rest arm 13 is directly attached to the middle piece 6 in between the two outer steady rest arms 11 and 12, with the effect that the middle piece 6 is arranged between the two outer steady rest arms 11 and 12. The three steady rest arms 11, 12 and 13 face towards the workpiece 2 to be clamped, and therefore they project both out of the middle piece 6 and out of the two housing halves 4 and 5. Moving the middle piece 6 towards the workpiece 2 therefore advances the three steady rest arms 11, 12 and 13 jointly and at equal speed up to the workpiece 2. During the advance movement of the middle piece 6, there is at first no relative movement of the two outer steady rest arms 11 and 12 in relation to the middle piece 6 in the linear guide groove 10.

Moreover, two guide strips 15 are arranged between the two housing halves 4 and 5 and run parallel to the lengthways axis 3 and at a distance from it. The guide strips 15 are mounted in one of the two housing halves 4 or 5 so as to allow a slight amount of sliding parallel to the lengthways axis 3, with the effect that the position of the guide strips 15 can be changed relative the housing halves 4 and 5. The guide strips 15 are in contact with the housing halves 4 or 5 in the lengthways direction 3' of the steady rest 1, and are supported by them. project into the control cam 41 or 42 and control the movement of the two outer steady rest arms 11 and 12 in a defined way.

Two half shells 18 and 19 are provided for the relative movement of the guide strips 15 and for positioning them at right angles to the lengthways axis 3. Both half shells 18 and 19 have a sickle-shaped, curved cross section, in order to have differently sized widths in relation to the movement direction 3' of the middle piece 6. The first half shell 18 has its curved outside 24 against a contact surface 25 of the housing half 5, and is supported by it in the movement direction 3'. The first half shell 18 can be moved at right angles to the movement direction 3' of the middle piece 6 by means of a screw 34. The opposite side of the first half shell 18 in relation to the screw 34 has a compression spring 35 arranged on it which applies a counter-force against the force exerted by the screw 34, with the effect that the first half shell 18 is supported between the screw 34 and the compression spring 35.

The inside 26 of the first half shell 18 has a constant curvature in the form of an arc which serves as a stop for a compensation element 27. The first surface 28 of the compensation element 27 facing the first half shell 18 has a contour which is adapted to the contour of the inside of the first half shell 18; the second surface 29 of the compensation element 27 is configured flat and runs at right angles to the lengthways axis 3.

A U-shaped compensation arm 20 is provided on the second surface 29 of the compensation element 27. The compensation arm 20 consists of two legs 20" running in parallel to one another which are connected by means of a connecting web 20'. The two legs 20" are supported on the housing half 5 in parallel to the movement direction 3' of the middle piece 6.

The side of the connecting web 20' facing away from the compensation element 27 has a trough 30 worked into it, which has an inside contour with a curved cross section. The second half shell 19 is inserted into the trough 30 and its surface 31 facing towards the connecting web 20' is adapted to the inside contour of the trough 30.

The second half shell 19 has two end faces 32, each of which faces towards one of the two guide strips 15 and has the guide strips 15 in contact with it, because these are pressed against the end faces 32 of the second half shell 19 by means of a coiled compression spring 33. As a result of the preload force exerted by the coiled pressure springs 33 that run in parallel to the lengthways axis 3 of the steady rest 1, the guide strips 15 are pressed towards the second half shell 19 with the effect that the second half shell 19 exerts a contact pressure force against the compensation arm 20, the compensation element 27, and thus on the first half shell 18. The first and second half shells 18 and 19, as well as the compensation element 27, and the compensation arm 20, are consequently arranged in series in relation to the movement direction 3' of the middle piece 6, and run at right angles to the lengthways axis 3.

Also, the second half shell 19 is moved by means of the screw 34 and the compression spring 33 in relation to the connecting web 20' or the compensation arm 20 at right angles to the lengthways axis 3, as a result of which the stop positions of the guide strips 15 can be changed synchronously to one another. This is explained in more detail below.

Figure 3A:
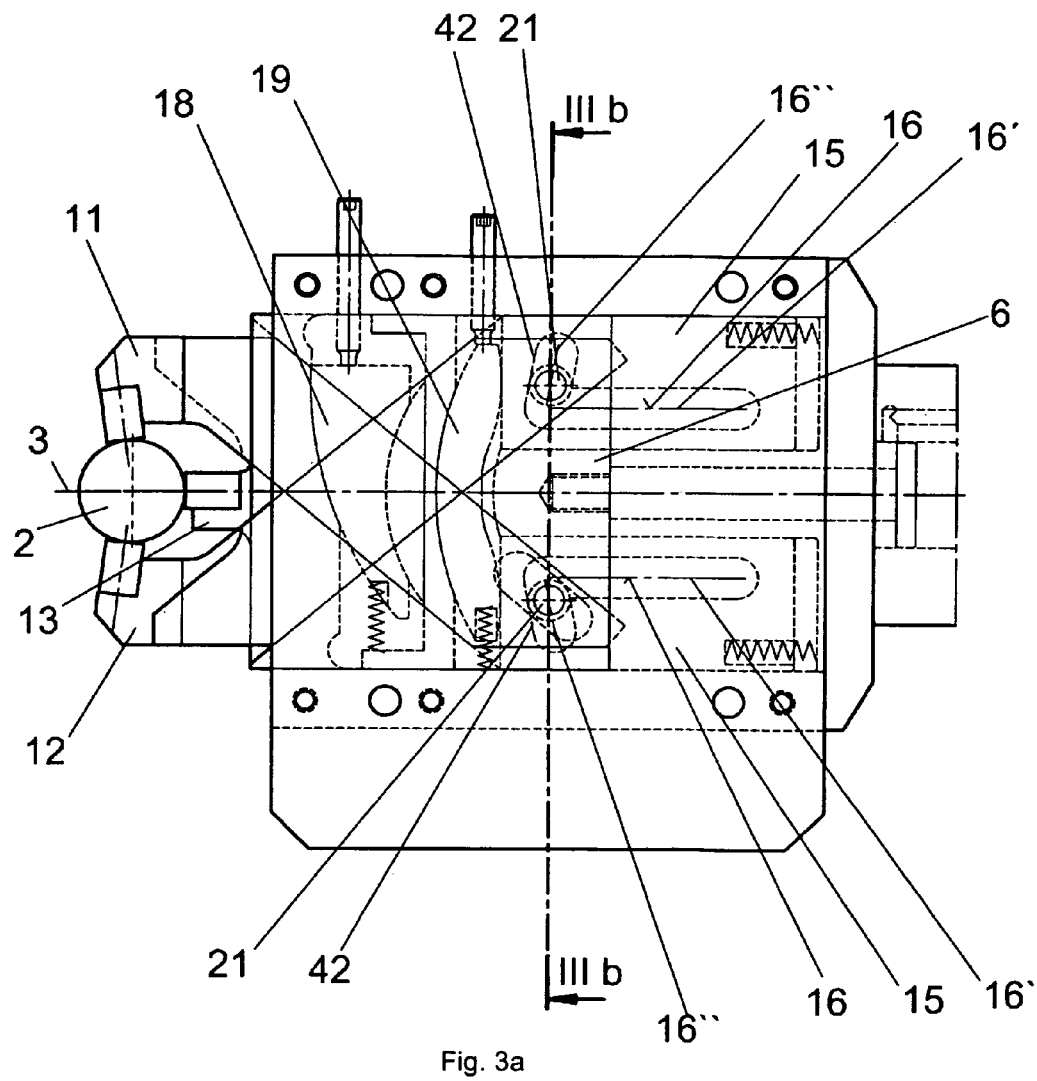
FIG. 3*a* shows the steady rest in accordance with FIG. 1, assembled and in the clamped condition of the workpiece.

FIG. 3*a* shows the assembled status of the steady rest 1, and shows that the three steady rest arms 11, 12 and 13 secure the workpiece in space. The first and second half shells 18 and 19 are each in their middle position in relation to the lengthways axis 3.

Figure 3B:
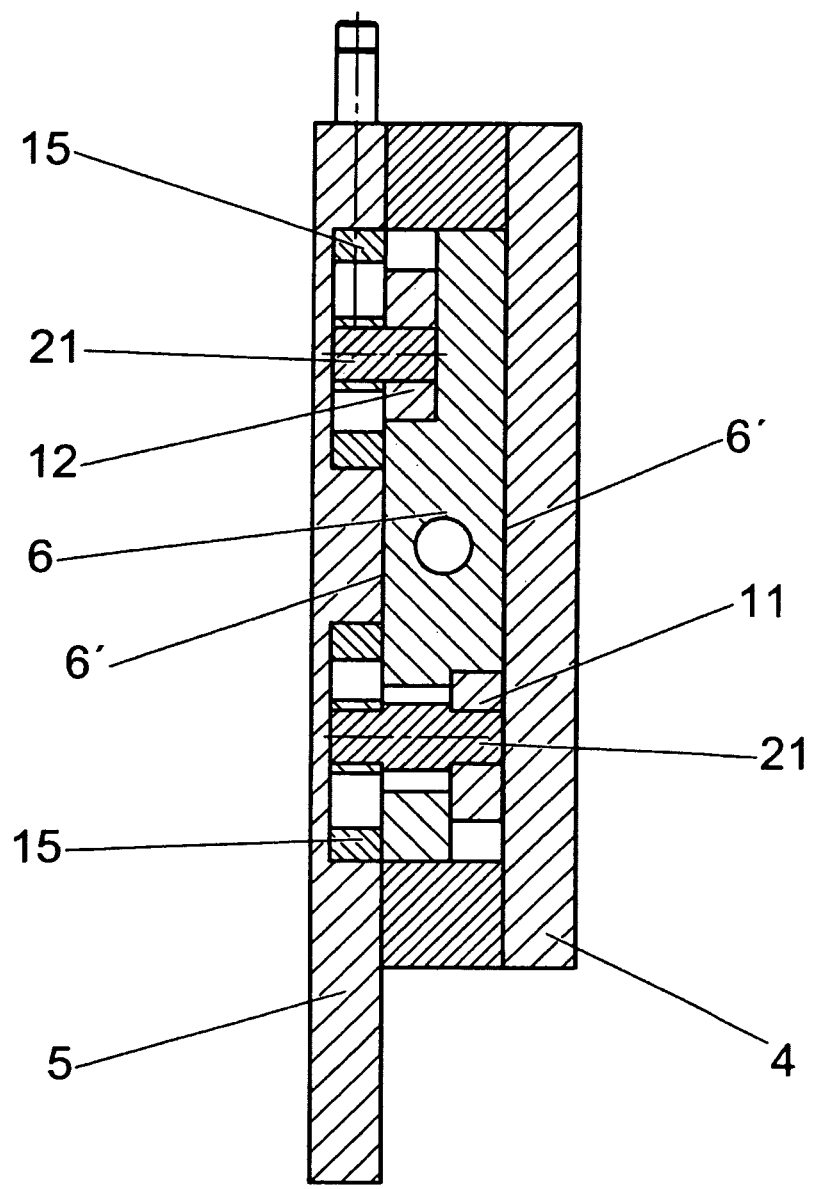
FIG. 3*b* shows the steady rest in accordance with FIG. 3*a* along a section line IIIb-IIIb.

Furthermore, FIGS. 3*a* and 3*b* show that there is a guide cam 16 worked into both guide strips 15 which is made up of two subsections 16' and 16". A guide pin 21 projecting at right angles from each free end 14 of the two outer steady rest arms 11 and 12 is inserted into the guide cam 16, and is mounted in the guide cam 16 in a movable arrangement. The guide pin 21 has the task of holding the two outer steady rest arms 11 and 12 reliably against the middle piece 6 by means of the guide strip 15.

The second subsection 16" of the guide cam 16 projects outwards from the first subsection 16' at an angle of about 80°; there is play between the guide pin 21 and the guide cam 16, with the effect that the advance movement of the two outer steady rest arms 11 and 12 is limited when the guide pin 21 projects into the second subsection 16" of the guide cam 16.

Figure 4A:
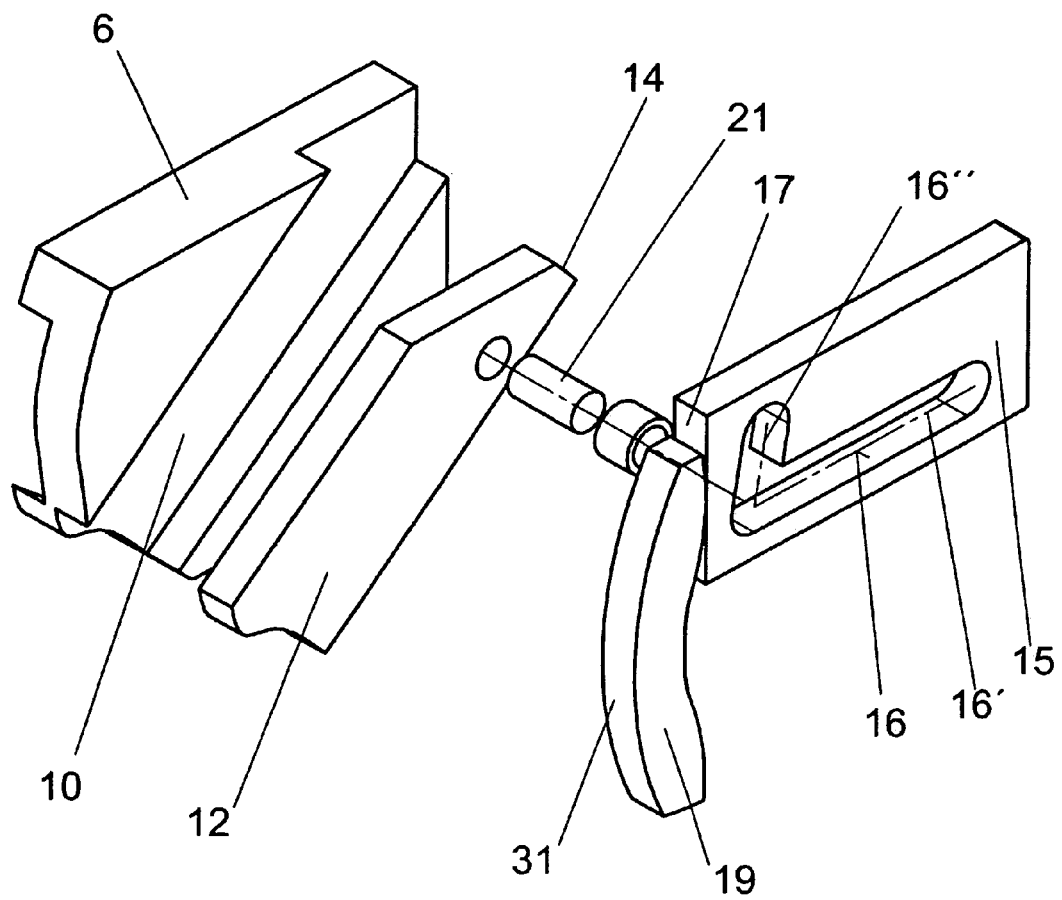
FIG. 4a shows the steady rest in accordance with FIG. 1, in an exploded view with individual components in the area of the upper outer steady rest arm magnified.
Figure 4B:
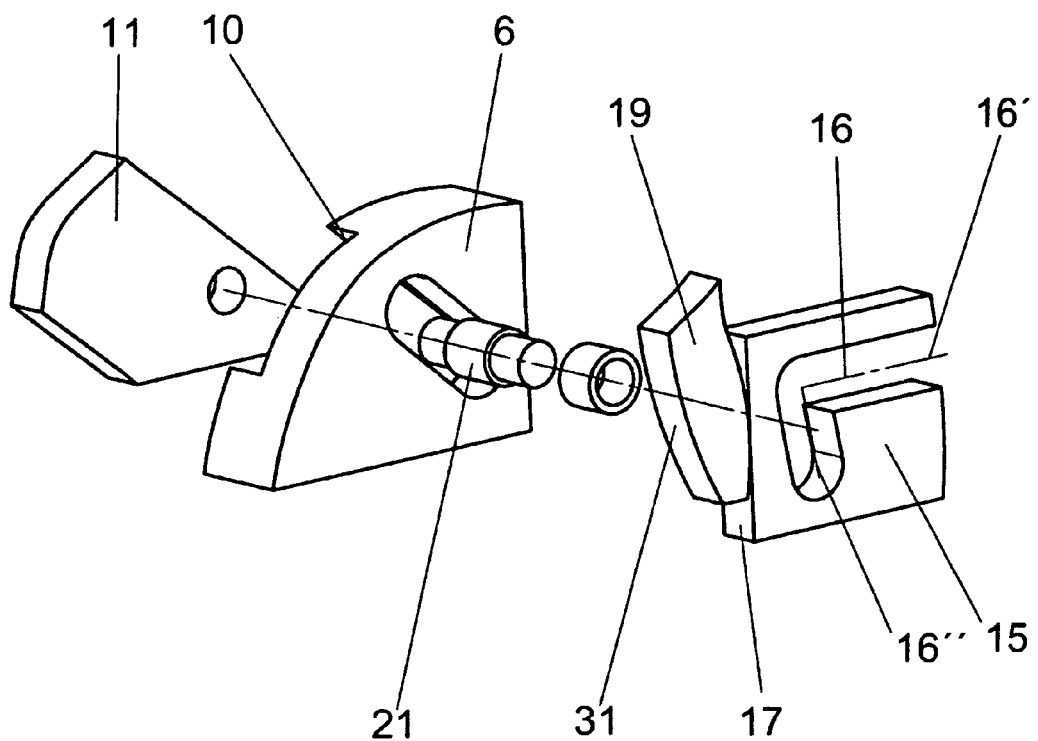
FIG. 4b shows the steady rest in accordance with FIG. 1, in an exploded view and with a magnified view of a lower steady rest arm.

FIGS. 4*a* and 4*b* show the sandwich construction of the steady rest 1, the individual components of which, especially the middle piece 6, the two outer steady rest arms 11 and 12, the guide strips 15 and the half shells 18 and 19, are arranged on different planes running parallel with one another. As long as the two housing halves 4 and 5 are firmly connected together and enclose a sufficiently large cavity, the components mounted in the housing halves 4 and 5 in an axially movable arrangement can be moved towards the workpiece 2 or vice versa. For one thing, such a movement is required in order to define the advance paths of the middle piece exactly to the workpiece and, for another thing, it is needed for coordinating the stop positions of the two outer steady rest arms 11 and 12 synchronously with one another.

Figure 5A:
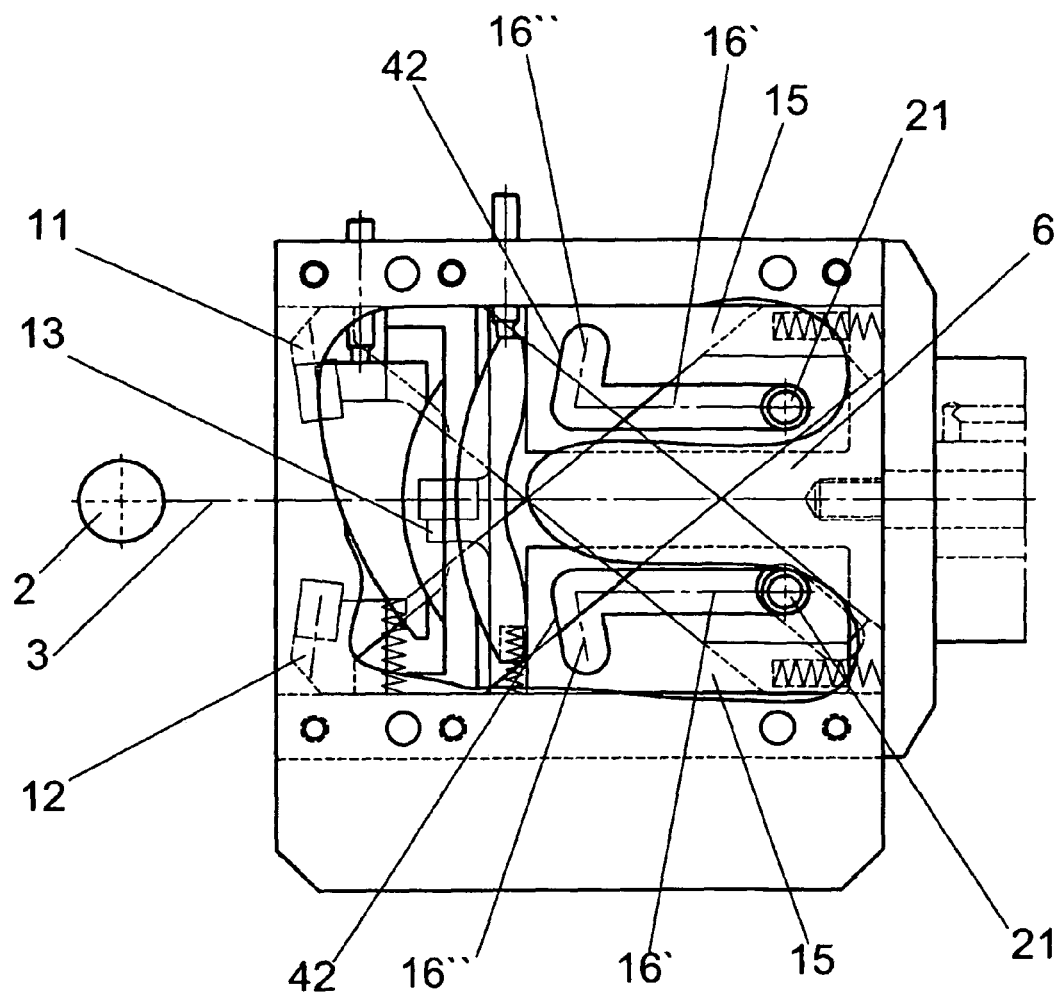
FIGS. 5a to 5e show the steady rest in accordance with FIG. 3a in different operating conditions, from an initial position through to a clamped condition.
Figure 5B:
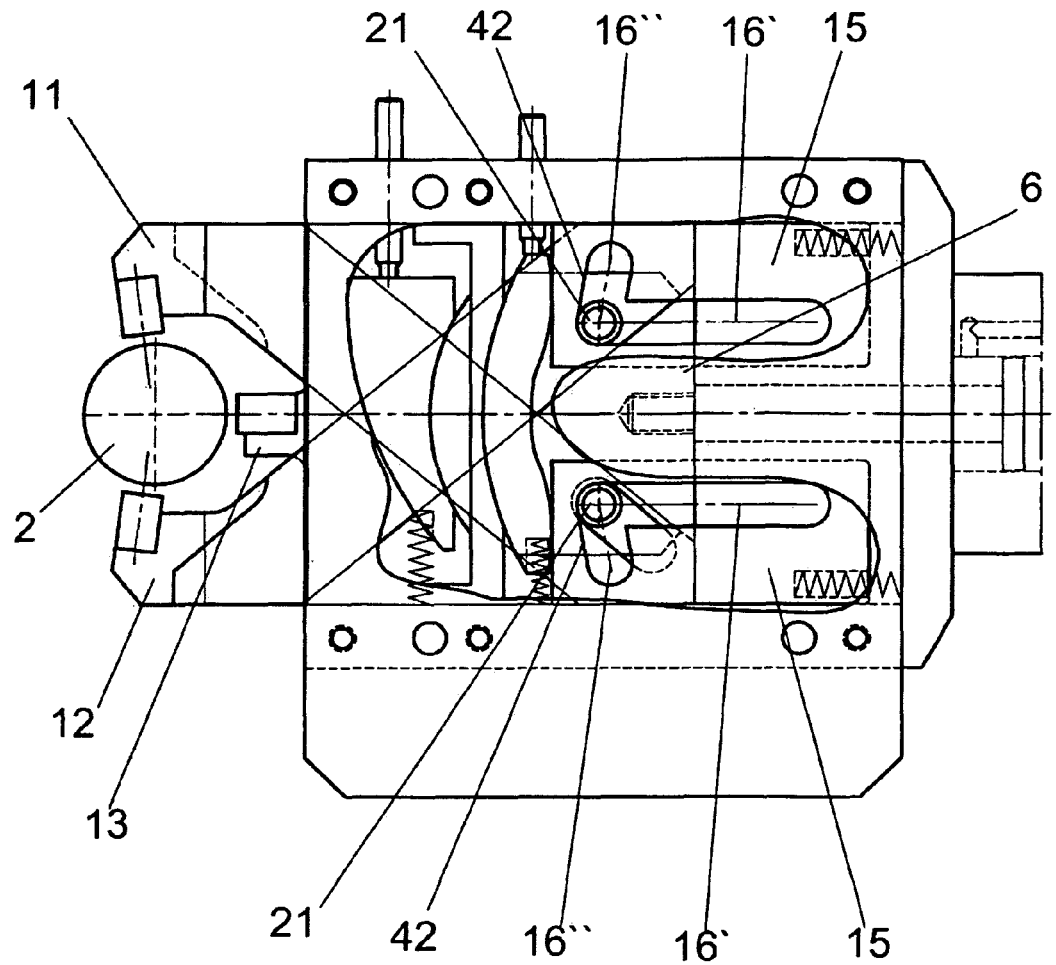

FIGS. 5*a* to 5*e* show the advance movement of the middle piece 6 in the direction of the workpiece 2. The starting position shown in FIG. 5*a* is translated into an intermediate position as shown in FIG. 5*b* by means of the drive of the middle piece 6 towards the workpiece 2. In this progress, the guide pins 21 have been moved axially in the guide strip 15 up to the end of the first subsection 16' of the guide cam 16. The steady rest arms 11, 12 and 13 have a specific, equally sized, distance from the workpiece 2 and the guide pins 21 are in contact between the first and the second subsection 16' and 16".

Figure 5C:
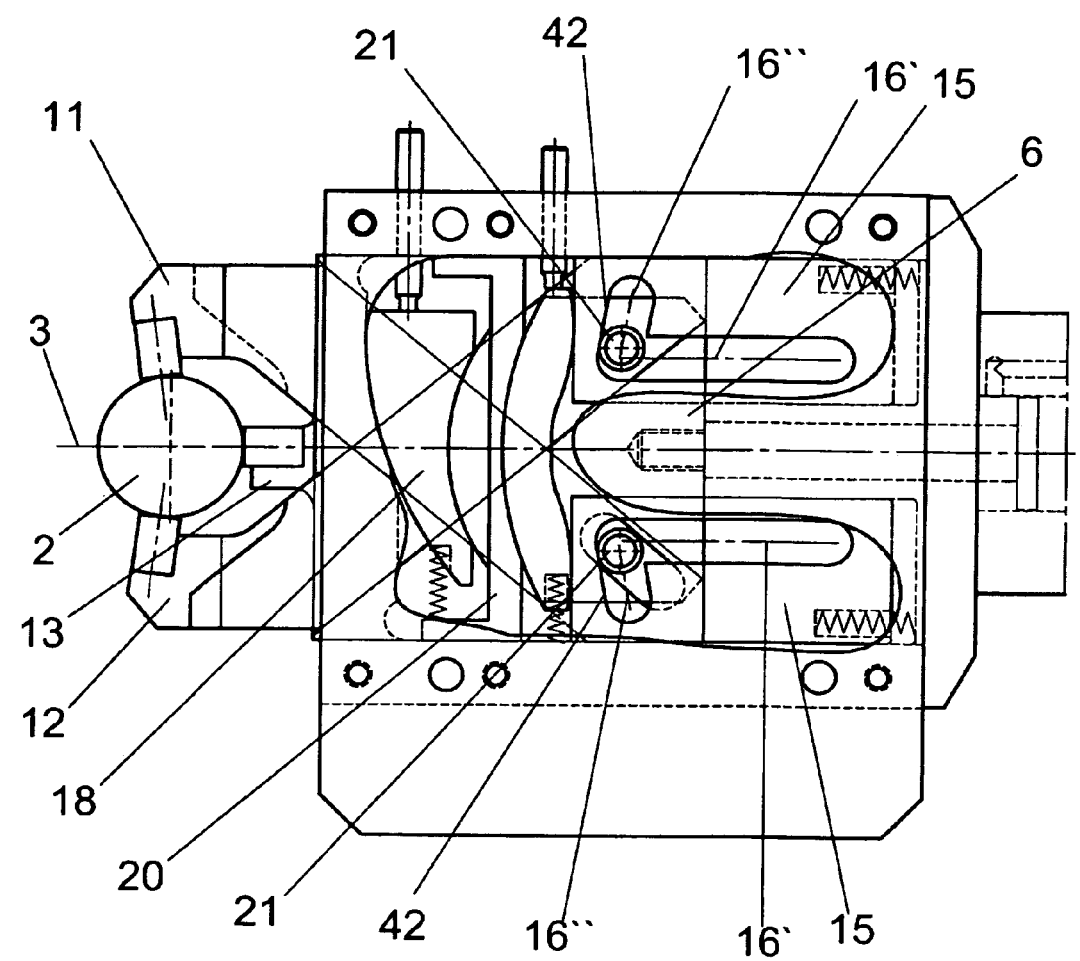

FIG. 5*c* shows the first active contact of the three steady rest arms 11, 12 and 13 with the workpiece 2. The advance path of the middle piece 6 is limited by the actuator piston 7. The position of the compensation arm 20 defined by the first half shell 18, on the other hand, defines the position of the guide pin 21 within the guide cam 16 and therefore represents a stop surface for it. The resulting position of the guide pins 21 determines the starting time of the clamping movement of the steady rest arms 11 and 12. The guide pins 21 have consequently moved partially into the outwardly projecting second subsection 16" of the corresponding guide cam 16, as a result of which the two outer steady rest arms 11 and 12 are each moved outwards relative to the middle piece 6 along the linear guide groove 10, and consequently the free ends of the two outer steady rest arms 11 and 12 facing the workpiece 2 are moved towards it.

Figure 5D:
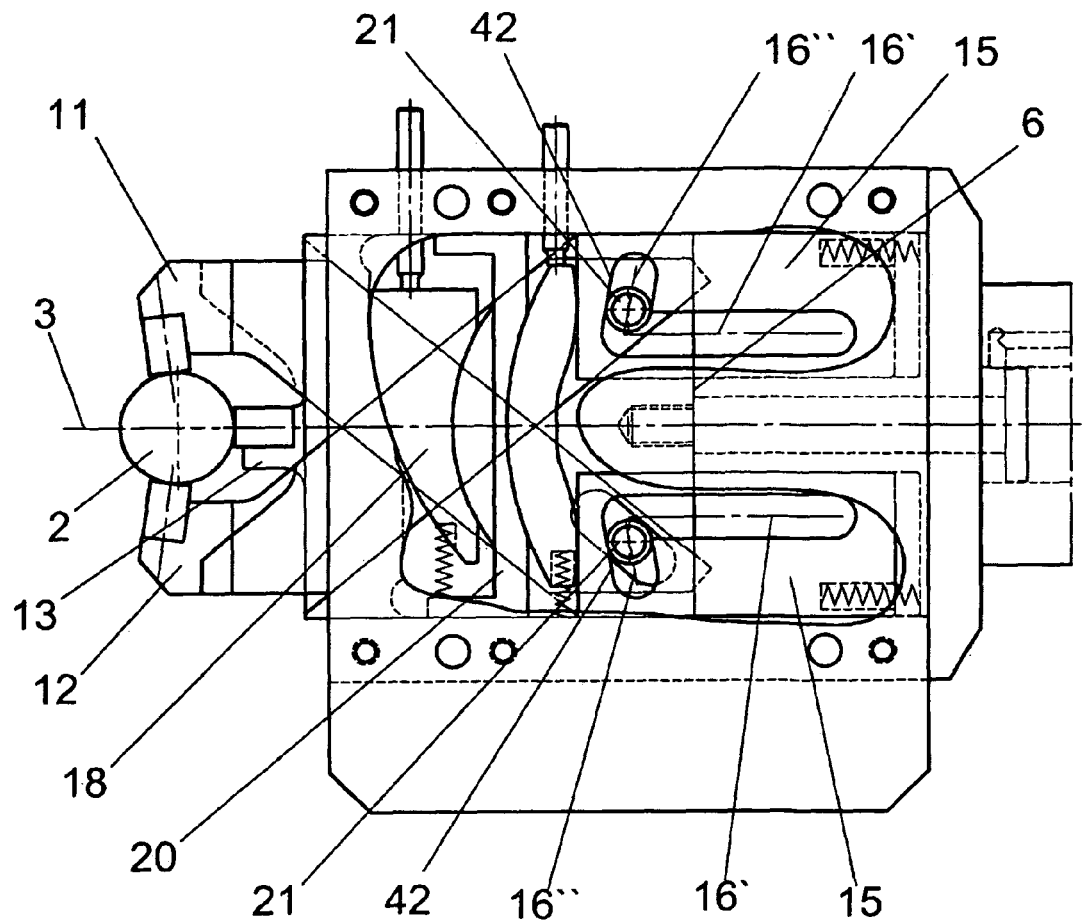
Figure 5E:
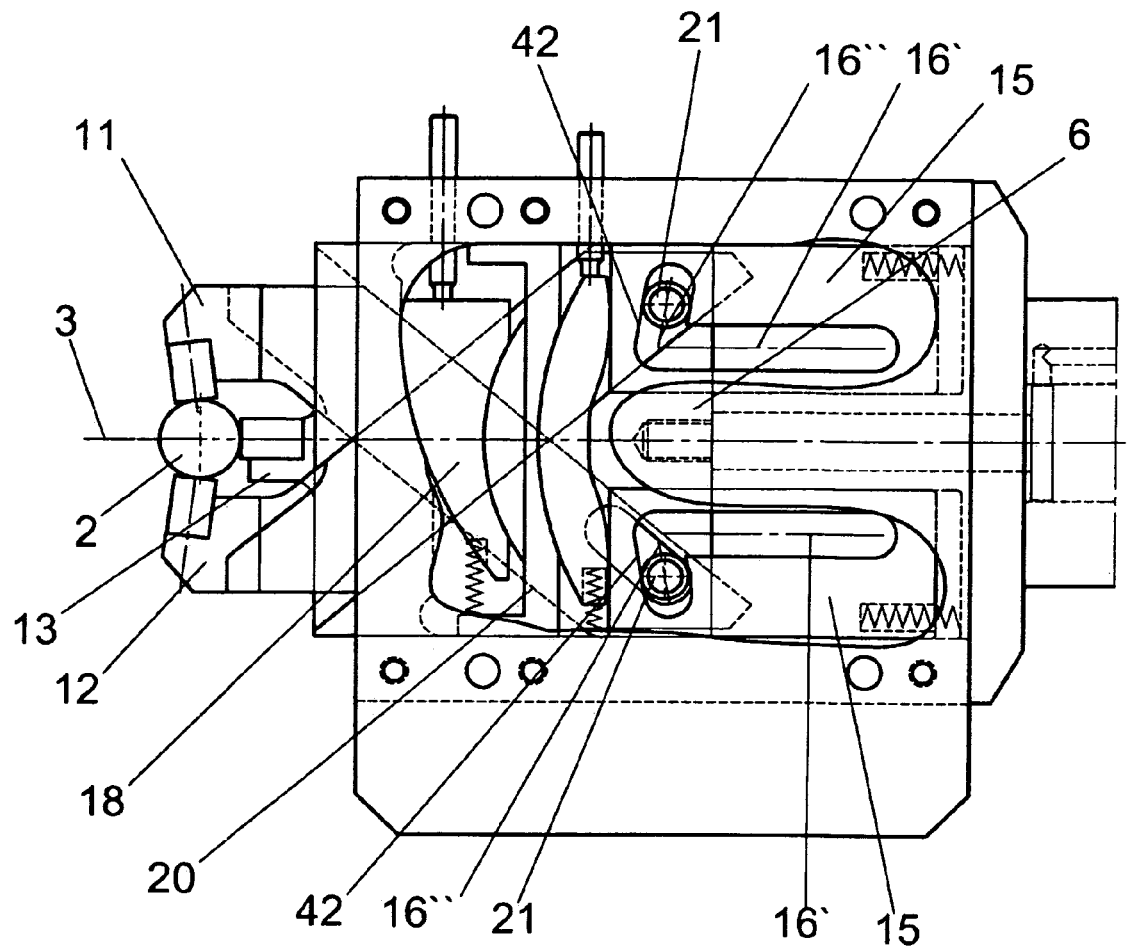

FIGS. 5*d* and 5*e* show the clamping movement of the steady rest arms 11, 12 and 13, because the guide pins 21 move further in towards the second subsection 16" of the corresponding guide cam 16, as a result of which the steady rest arms 11 and 12 exert a defined clamping force on the workpiece 2, so the middle piece 6 and the middle steady rest arm 13 is advanced further towards the workpiece 2. The middle steady rest arm 13 is pressed against the workpiece 2 synchronously with the outer steady rest arms 11 and 12 as a result of the axial advance movement of the middle piece 6, as a result of which all three steady rest arms 11, 12 and 13 exert a clamping force of equal magnitude on the workpiece 2.

Figure 6A:
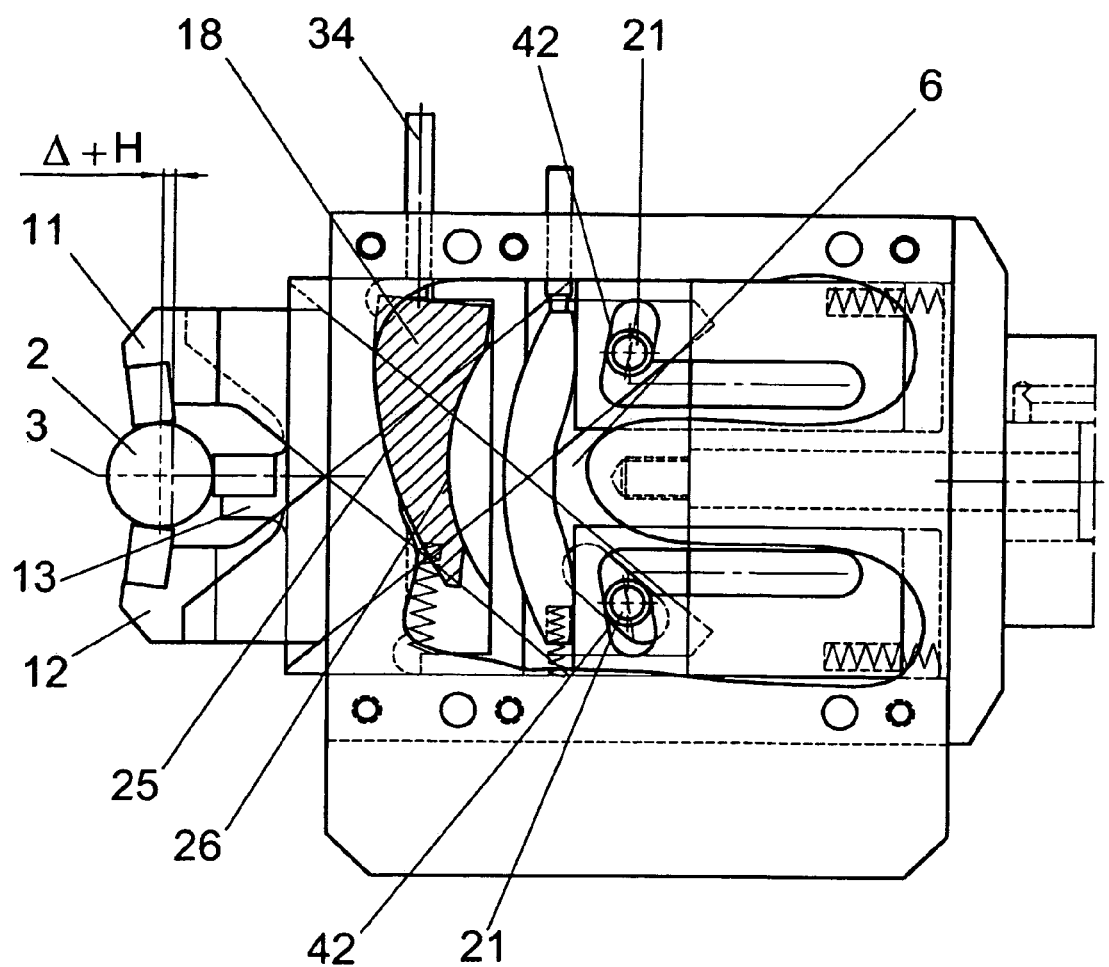
FIGS. 6a and 6b show the adjustment possibilities of the first half shell in the two housing halves in accordance with FIG. 3a for horizontal alignment of the steady rest arms, in each case in section.
Figure 6B:
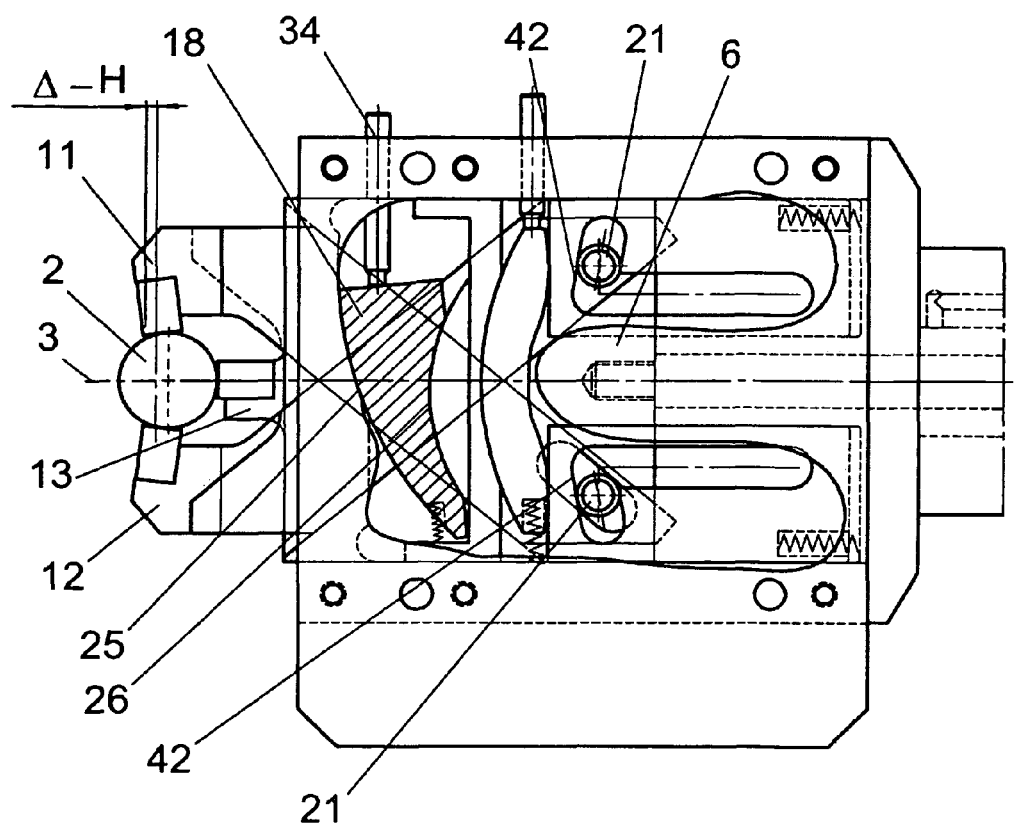

FIGS. 6*a* and 6*b* show the horizontal adjustment or horizontal positioning of the workpiece 2. For this purpose, the first half shell 18 is moved by the screw 34 transversally to the movement direction 3' of the middle piece 6. As a result of the sickle-shaped curved cross-sectional contour of the first half shell 18, the distance between the contact surface 25, the housing half 5 and the inside 26 of the first half shell 18 changes. This change in distance means that the advance path of the middle piece 6 is longer or shorter than the advance path of the middle piece 6 that is set in FIGS. 5*a* to 5*e*. As a result of the lengthening or shortening of the distance from the workpiece 2 to be clamped from the housing halves 4, 5, the three steady rest arms 11, 12 and 13 enter into active contact with the workpiece 2 at an earlier or later stage. However, the advance movement of each of the steady rest arms 11, 12 and 13 is firmly coupled with the middle piece 6, with the effect that the advance speeds of the steady rest arms 11, 12 and 13 are equal and their distance from the workpiece 2 is adjusted in such a way that the active contact of the corresponding steady rest arms 11, 12 and 13 takes place exactly at the time when the centering of the workpiece 2 has to take place.

Consequently, the position of the workpiece 2 changes in the space, although exclusively in the horizontal plane. This horizontal change of the workpiece is referred to schematically in FIG. 6*a* as Δ+H. FIG. 6*b* shows the opposite extreme position, and thus the movement of the workpiece 2 by the value Δ−H.

Figure 7A:
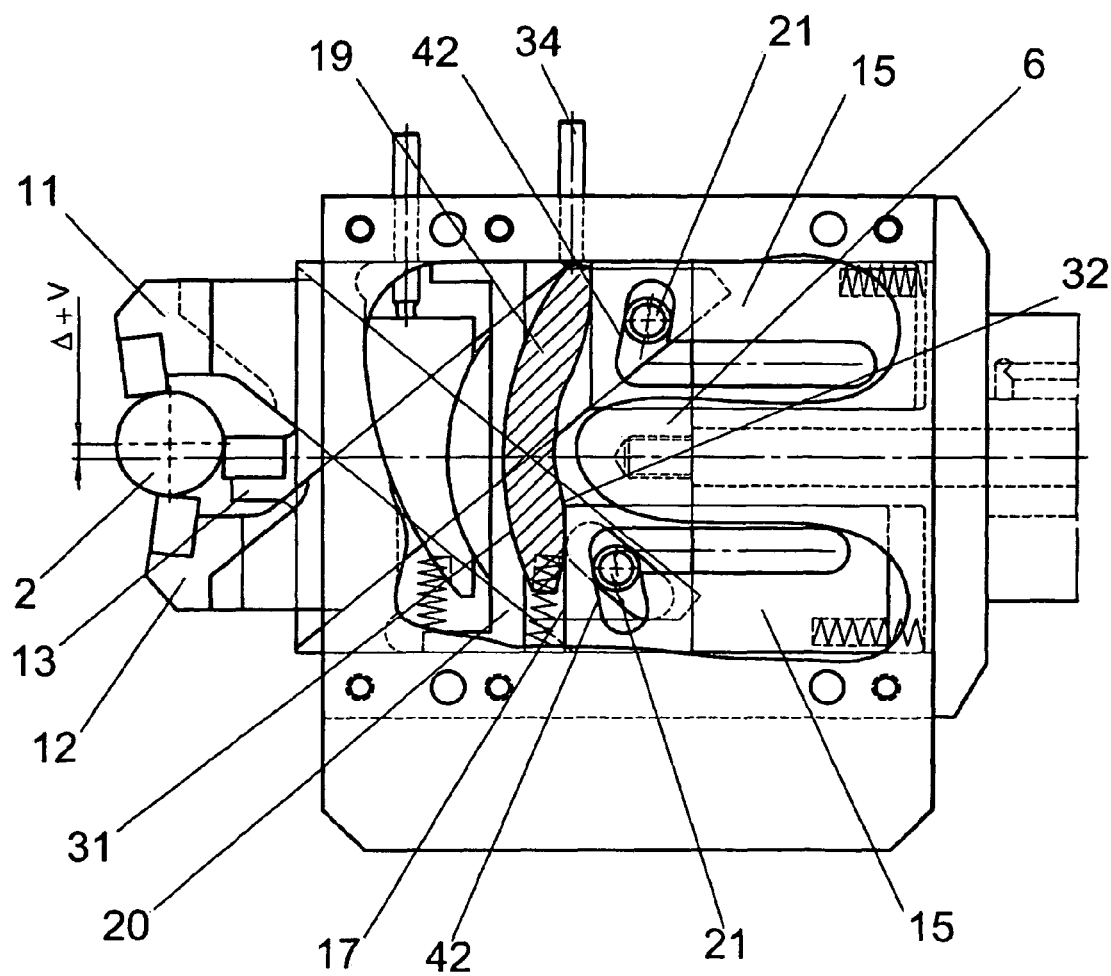
FIGS. 7a and 7b show the relative movements of the second half shell in accordance with FIG. 3a in the housing halves for vertical centering of the workpiece by means of the two outer steady rest arms, in each case in section.
Figure 7B:
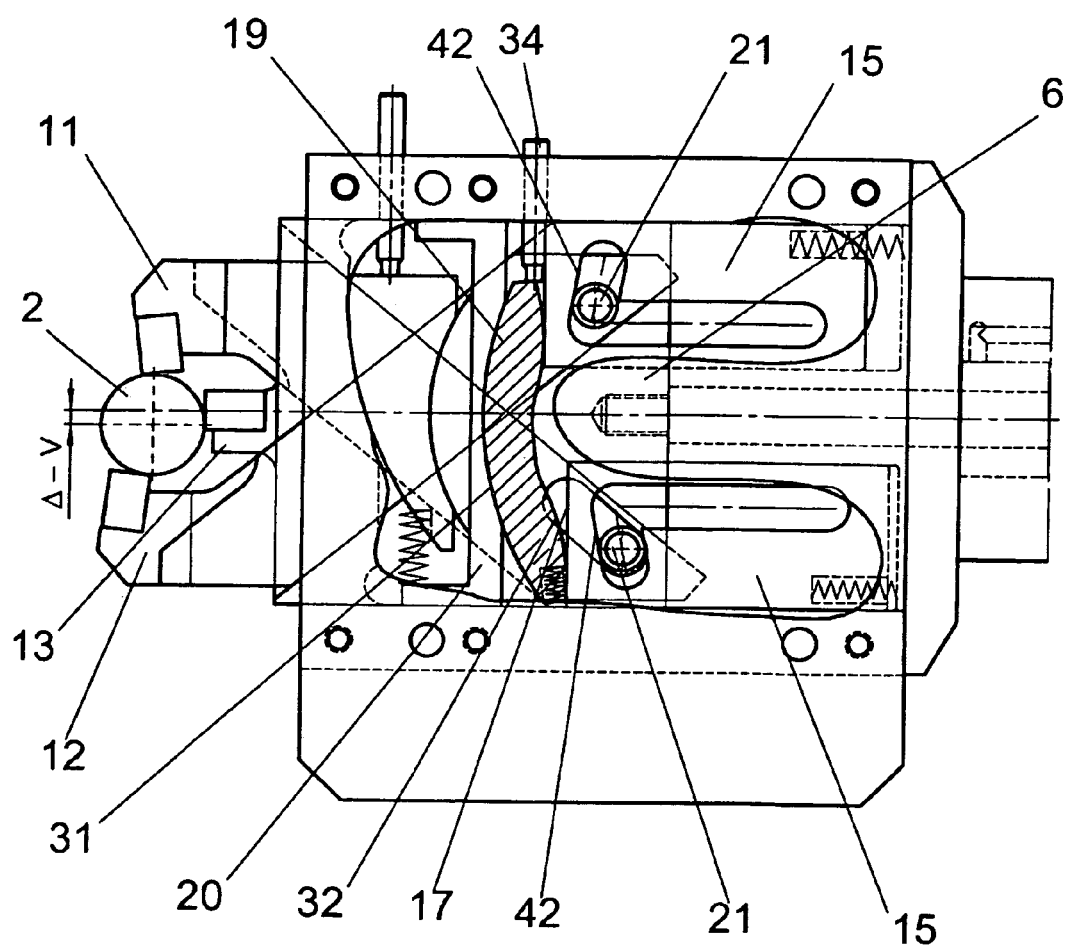

FIGS. 7*a* and 7*b* shows the vertical alignment of the workpiece 2 by means of the two outer steady rest arms 11 and 12. For this purpose, the second half shell 19 can be changed by means of the screw 34 in relation to the U-shaped compensation arm 20 and transversally to the movement direction 3' of the middle piece 6. As a result of the sickle-shaped cross-sectional contour of the second half-shell 19, the distance between the compensation arm 20 and the two guide strips 15 changes, which means that the guide strips 15 either run in the middle position flush with one another or, in the setting variants shown in FIGS. 7*a* and 7*b*, offset in relation to one another.

Consequently, the moment of contact of the guide pins 21 fitted to the steady rest arms 11 and 12 changes on the control surfaces 42 of the second subsection 16" and as soon as the guide pin 21 makes contact with the control cam 42, the clamping of the two outer steady rest arms 11, 12 begins. Due to the different alignment of the guide pins 21 in space, they engage in the second subsections 16" of the guide cam 16 at different times, with the effect that the guide pins 21 come into contact with the control surface 42 at offset times from one another and have their movement influenced by this control surface 42. When the advance speed of the middle piece 6 is constant, the movements of the outer steady rest arms 11, 12 are controlled according to the selected position of the guide strips 15 and 16. In turn, this means that one of the outer steady rest arms 11 or 12 is moved towards the workpiece 2 offset in time from the other steady rest arm 12 or 11 in each case, and then enters into a positive-locking active connection with it.

The positional shift of the workpiece 2 is shown in FIGS. 7*a* and 7*b* in the vertical plane with Δ+V or Δ−V.

The invention claimed is:

1. A steady rest for centering a rotationally symmetrical workpiece in space, the steady rest comprising:
two housing halves spaced from one another and interconnected,
a plate-shaped middle piece disposed between said two housing halves and mounted in said housing halves by an actuator piston, and moveable axially to the workpiece,
two linear guide grooves disposed in two opposite end faces of said middle piece, with said linear guide grooves extending in a cross-shaped arrangement and at an angle to a movement direction of said middle piece,
two outer steady rest arms, each moveably mounted in one of said linear guide grooves of said middle piece,
and a middle steady rest arm attached to said middle piece between said outer steady rest arms,
wherein
two guide strips adjustable in a movement direction are disposed between said two housing halves, and a curved guide cam is disposed in each of said guide strips, each of said guide cams being provided with a guide pin attached therein and allocated to a free end of said two outer steady rest arms on said middle piece, the guide pin being disposed in one of said guide cams in an axially movable arrangement, the positions of said middle piece in relation to a distance between said middle piece and the workpiece to be clamped being adjustable by means of a first half shell with a sickle-shaped, curved, cross section, the positions of said two guide strips being changeable in relation to one another by a second sickle-shaped, curved half shell in opposite directions in a synchronised manner, and wherein the two half shells are disposed in line in a movement direction of said middle piece and are separated from one another by a compensation arm moveable axially in the two housing shells and forming a contact surface for an end position of said middle piece.

2. The steady rest in accordance with claim 1, wherein
each of said guide cams is provided with two subsections in a guide strip, the first guide cam subsection extending parallel to the movement direction of said middle piece, and a second guide cam subsection extending at an angle of 10° to 89° in relation to the first subsection, and the two second subsections of said guide cams of the guide strip project outwardly from and transversely to said first guide cam subsection.

3. The steady rest in accordance with claim 2, wherein
a second subsection of the corresponding guide cam forms a control surface for the guide pin of said steady rest arms by means of which said two outer steady rest arms are guided outwards during movement of said middle piece in the direction of the workpiece along the control surface, and said steady rest arms advance towards one another, depending on a profile of the control surface.

4. The steady rest in accordance with claim 2, wherein
said middle piece is provided with a recess through which the guide pin of the upper outer steady rest arm passes, and the recess extends offset to the second subsection of said guide cam of said guide strip.

5. The steady rest in accordance with claim 1, wherein
said two guide strips are pressed against end faces formed on the second half shell by a compression spring.

6. The steady rest in accordance with claim 1, wherein
in an assembled condition, the outside of the first half shell facing the workpiece is in contact with a contact surface of one of said two housing halves, contours of a contact surface and an outside surface of the first half shell correspond to one another, and the first half shell is movable relative to the outside surface and at right angles to the movement direction of said middle piece.

7. The steady rest in accordance with claim 6, wherein
an inside of the first half shell opposite to the outside thereof is curved, with a constant radius, and a compensation element is in contact with the inside of the first half shell in an assembled condition, with a surface of the compensation element facing the first half shell being adapted to the inside contour of the first half shell, and an opposite surface thereof being flat.

8. The steady rest in accordance with claim 7, wherein
the flat surface of the compensation element is adapted to make contact with the compensation arm in an assembled condition, without play in the direction of the movement direction of said middle piece.

9. The steady rest in accordance with claim 8, wherein
the compensation arm is provided with a U-shaped cross section, and a trough with a curved cross section is disposed in a connection web of the compensation arm, with the second half shell inserted in the trough, and a surface contour of the second half shell corresponds to the inside contour of the trough of the compensation arm.

10. The steady rest in accordance with claim 5, wherein
the end faces of the second half shell contact one of the guide strips in the assembled condition, and form one contact surface for axial movement of the guide strips.

11. The steady rest in accordance with claim 8, wherein
the first and second half shells are moveable at right angles to the movement direction of said middle piece, by means of screws and coiled compression springs as a counter-force relative to said first and second housing halves.

12. A steady rest for centering a rotationally symmetrical workpiece in space, the steady rest comprising
two housing halves spaced from one another and interconnected,
a plate-shaped middle piece disposed between said two housing halves and mounted in said housing halves by an actuator piston, and moveable axially of the workpiece,
two linear guide grooves disposed in two opposite end faces of said middle piece and extending in cross-shaped arrangement and at an angle to a movement direction of said middle piece,
two outer steady rest arms, each moveably mounted in one of said linear guide grooves of said middle piece, and
a middle steady rest arm attached attached to said middle piece between said outer steady rest arms,
wherein two guide strips adjustable in a movement direction are disposed between said two housing halves,
a curved guide cam is disposed in each of said guide strips, each of said guide cams being provided with a guide pin fixed therein and all allocated to a free end of said two outer steady rest arms on said middle piece,
the guide pins each being axially moveably disposed in one of said guide cams, the positions of said middle piece, in relation to a distance between said middle piece and the workpiece to be clamped, being adjustable by means of a first half shell with a sickle-shaped, curved, cross section, the positions of said two guide strips being changeable in relation to one another by a second sickle-shaped, curved half shell in opposite directions in a synchronized manner, and wherein said middle piece is provided with a recess through which the guide pin of an upper outer one of the steady rest arms passes.

* * * * *